(12) United States Patent
Ossevoort et al.

(10) Patent No.: US 7,331,686 B2
(45) Date of Patent: Feb. 19, 2008

(54) ILLUMINATING SURFACE

(75) Inventors: Stijn Hermannus Wilhelmus Ossevoort, Waalre (NL); Natalie Woolf, London (GB)

(73) Assignee: Royal College of Art, London (GB)

( * ) Notice: Subject to any disclaimer, the term of this patent is extended or adjusted under 35 U.S.C. 154(b) by 46 days.

(21) Appl. No.: 10/500,817

(22) PCT Filed: Jan. 8, 2003

(86) PCT No.: PCT/GB03/00032

§ 371 (c)(1),
(2), (4) Date: Mar. 29, 2005

(87) PCT Pub. No.: WO03/059016

PCT Pub. Date: Jul. 17, 2003

(65) Prior Publication Data

US 2005/0168984 A1     Aug. 4, 2005

(30) Foreign Application Priority Data

Jan. 8, 2002     (GB) ................................. 0200343.2

(51) Int. Cl.
*F21S 8/00*     (2006.01)
*G06F 3/041*    (2006.01)

(52) U.S. Cl. ..................................... 362/145; 345/173

(58) Field of Classification Search ........ 345/173–178; 178/18.01–18.11, 19.01–19.07; 362/145–153, 362/153.1, 276

See application file for complete search history.

(56) References Cited

U.S. PATENT DOCUMENTS 4,121,204 A    10/1978  Welch et al.
5,099,402 A *   3/1992  Starniri .................. 362/146
6,107,930 A     8/2000  Behlke et al.
6,116,748 A *   9/2000  George .................. 362/145
6,354,714 B1*   3/2002  Rhodes .................. 362/153.1
2002/0015024 A1* 2/2002 Westerman et al. ....... 345/173
2005/0116667 A1* 6/2005 Mueller et al. .......... 315/312

FOREIGN PATENT DOCUMENTS

DE    20005853    8/2002
FR    2752912     3/1998
GB    2313194     11/1997

* cited by examiner

*Primary Examiner*—Amr A. Awad
*Assistant Examiner*—Stephen Sherman
(74) *Attorney, Agent, or Firm*—Hunton & Williams LLP

(57) ABSTRACT

The present invention provides an illuminating surface, e.g. a floor or wall tile, that includes an array of identical circuits (G, K, H, L) that can each be connected to a power source/14). The surface emits light in the presence of an object touching or in close proximity to the surface. Each circuit includes a sensor (12), e.g. a pressure switch, for detecting the presence of the object; at least one light source (20) that is illuminated when the sensor of that circuit detects the presence of the object. The circuits control the illumination of the light sources (20) such that the light sources remains illuminated for a time after its associated sensor (12) has ceased to detect the presence of the object. Each of the circuits is connected with at least one adjacent circuit, and, when the sensor of the first-mentioned circuit detects the presence of an object, the light source(s) (20) of the adjacent circuits are illuminated, thereby causing an area of the surface to emit light that corresponds to and is larger than the shape of the object.

14 Claims, 3 Drawing Sheets

ILLUMINATING SURFACE

TECHNICAL FIELD

The present invention relates to an illuminating surface that emits light in the presence of an object touching or in close proximity to the surface.

It is known to use light emitting tiles to form a floor or ceiling panels. It is also known that the illumination given by such panels can be touch-sensitive. This is achieved, according to a known arrangement, by providing a gel layer between a light source and the front surface of the panel; when the gel layer is pressed, it becomes thinner in that region and accordingly allows more light to pass to the front surface. In time, the gel returns to a uniform thickness, thereby causing the light to emit uniform illumination once again.

It is also known to mark out a path to be followed using individual light sources; such an arrangement is known, for example, in aircraft to mark the path to emergency exits.

When used as floor tiles, it would be advantageous to emit light not only from the area being touched but also from adjacent areas so that, if the rest of the room is dark, light can escape from the adjacent areas to provide illumination for a person crossing the floor, e.g. a child looking for the toilet in the middle of the night. It is also desirable, for the same reason, that light is still emitted even after a person's foot has been lifted from the floor so that the path of the person remains illuminated. Such an arrangement can also be useful for security purposes to show that a person has crossed a floor and where that person has gone.

DISCLOSURE OF INVENTION

According to the present invention, there is provided an illuminating surface that, when connected to a power source, emits light in the presence of an object touching or in close proximity to the surface, which surface comprises: an array of sensors for detecting the presence of the object (which will in many applications be a person's foot or hand); an array of light sources, each sensor being associated with at least one light source such that, when one of said sensors detects the presence of the object, its associated light source is illuminated; and a circuit for controlling the illumination of each light source such that it remains illuminated for a time after its associated sensor has ceased to detect the presence of the object; wherein each of the light sources is connected with at least one adjacent sensor and is illuminated when the adjacent sensor detects the presence of an object thereby causing an area of the surface to emit light that corresponds to and is larger than the shape of the object.

The sensors can be proximity sensors, e.g. based on capacitance in the space above the surface, or contact sensors, e.g. simple switches that are closed by predetermined pressure applied to the surface. Both types of sensors are well known and accordingly further description is unnecessary.

The illuminating surface is preferably an array of circuits, each circuit comprising at least one sensor and at least one light source. Each circuit preferably includes a single circuit and at least one light source. The greater the number of light sources that are controlled by each sensor, the poorer the definition of the illuminated area will be; on the other hand, the use of two or more light sources for each sensor reduces (as compared to one light source per sensor) the cost and the complexity of illuminating the area. In order to simplify the operation of the surface, each circuit has its own power supply and controls its own light source(s); such an arrangement dispenses with the use of a central processor to control the illumination of the surface; the use of such a central processor adds greatly to the complexity of the installation of an illuminating surface since it requires data lines to be provided to each light source to control its operation.

As mentioned above, the area of the surface that emits light is larger than the shape of the object touching or in close proximity to the surface. This may be achieved by connecting adjacent circuits together in such a way that, when the sensor of one circuit (the "detecting circuit") detects the presence of the object, the light source of at least one adjacent circuit is caused to be illuminated. Preferably, the light source of the adjacent circuit is illuminated after a delay following the illumination of the light source of the detecting surface, thereby giving the effect that the surface that emits light in the presence of the object is spreading.

When the object is removed from contact or proximity with the surface, the light sources of the relevant circuits cease to be illuminated; it is preferred that the light sources of the adjacent circuits cease to be illuminated prior to the light sources of the detecting circuit, thereby giving the effect that the area of the surface that emits light shrinks when the object is no longer touching or adjacent to the surface.

Preferably, each detecting circuit is energisable from a power source when its sensor detects the presence of an object touching or in close proximity to the surface, thereby activating the light source of that circuit; in a preferred embodiment, current from the detecting circuit can leak to adjacent circuits, thereby activating the light source of the adjacent circuit.

It is preferred that each circuit includes a transistor having a base terminal, an emitter terminal and a collector terminal, the arrangement being such that the light source is illuminated when the transistor becomes conductive; when the sensor detects the presence of an object, the potential of the base is preferably changed, thereby allowing current to flow through the transistor and so also activating the light source to emit light.

Each circuit is preferably connected to the base of the transistor of an adjacent circuit, whereby potential from a detecting circuit can be applied to the base of the adjacent circuit, thereby rendering the transistor of the adjacent circuit conductive and hence the light source of the adjacent circuit to be activated. Preferably, the connection between each circuit and the base of the transistor of the adjacent circuit is via a resistor, so that the potential applied to the transistor base of an adjacent circuit is less than the potential applied to the transistor base of the detecting circuit. With such an arrangement, when the potential leaks from the transistor base following removal of the object, the light source of the adjacent surface is switched off prior to the light source of the detecting circuit.

The "object" that will cause the illumination of the surface may not only be an inanimate object but also a person; when used as a floor, the surface can be rendered illuminating by walking across it.

The advantage of the present invention is that the area of the illuminating surface that emits light is larger than the area of the object; since the object will block light from the surface in contact with the object, such an arrangement increases the level of illumination provided by the surface. This is advantageous when the illuminating surface is used to light a walker's passage across a room and for decorative effect.

The light sources will continue to emit light even after the object has been removed; this again increases the level of illumination provided by the illuminating surface and its decorative effect. In addition, it can be used for security purposes to show, for example, the passage of someone who has crossed a room.

It is possible to link all or some of the light sources to a microprocessor so that they can be illuminated prior to a person walking across the surface to mark a path across the surface. However, that requires conductive paths between the microprocessor and the light sources that increases the complexity of the system but it is a possible additional feature of the present invention if the effect is thought worthwhile in view of the additional complexity.

BRIEF DESCRIPTION OF THE DRAWINGS

There will now be described, by way of example only, two embodiments of an illuminating surface according to the present invention by reference to the accompanying drawings in which.

DESCRIPTION OF BEST MODE OF OPERATION

Figure 2:
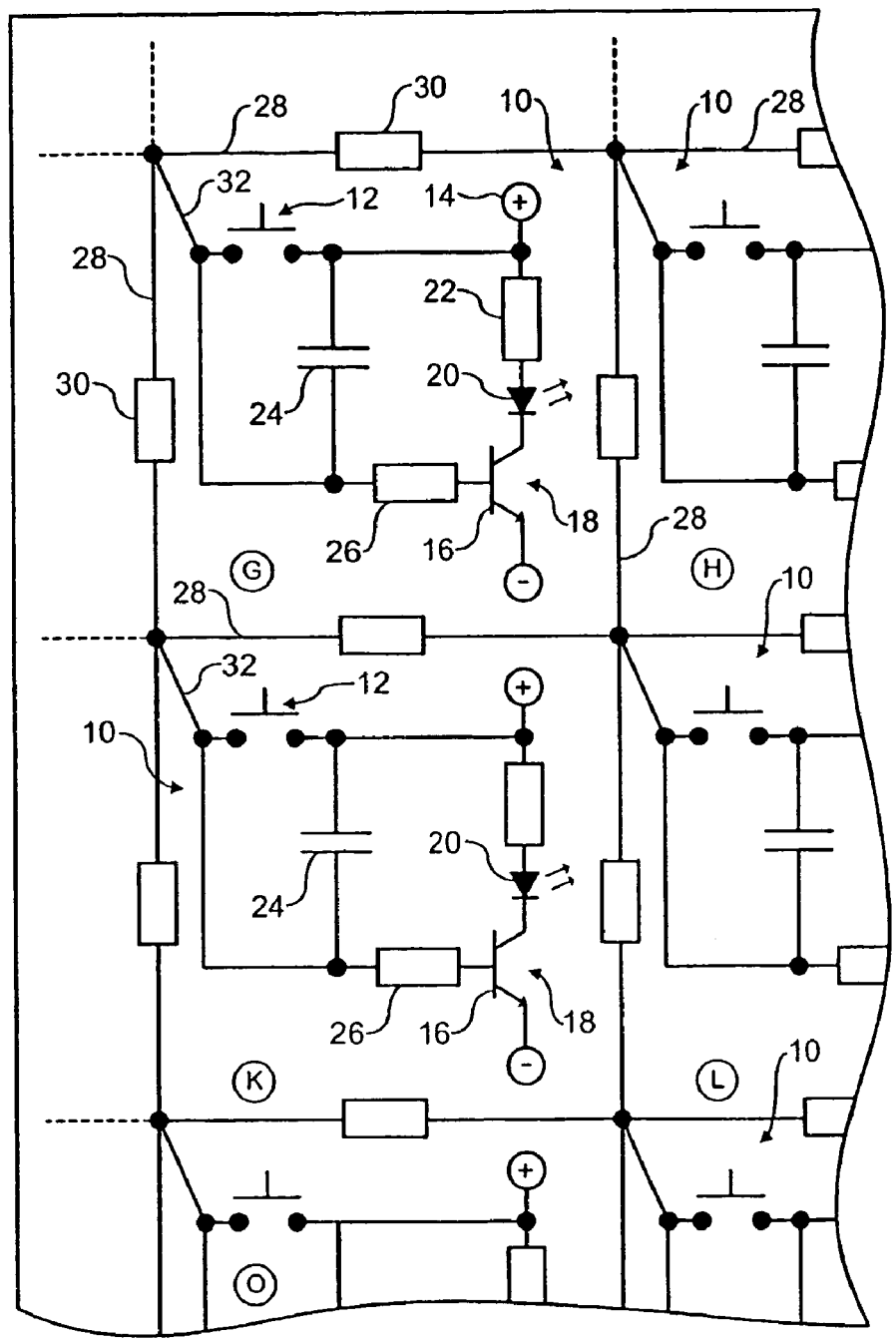
FIG. 2 shows the same circuits as FIG. 1 but on an expanded scale.

Referring initially to FIG. 2, there is shown an array of circuits 10, which are all identical. In view of this, only the components of the circuit (circuit G) in the top left hand corner of FIG. 2 will be shown.

The circuit comprises a switch 12 connected between a source of potential 14 (e.g. about 12 volts so that the floor does not carry high potential, which could be hazardous) and the base terminal 16 of a Darlington NPN transistor 18. The circuit also includes a light emitting diode (LED) 20 connected between the transistor 18 and the potential source 14; a resistor 22 is included between the potential source 14 and the light emitting diode 20. A capacitor 24 is connected in parallel with the switch 12 and a resistor 26 is connected in series between the switch 12 and the base terminal 16. Lines 28 connect adjacent circuits 10 via resistors 30. A connection 32 is introduced between lines 28 of each circuit and the resistor 26 so that potential can be applied from line 28 via resistor 26 to the base terminal 16 of transistor 18.

The emitter terminal of transistor 18 is connected to a negative potential source or, more generally, to earth.

Transistor 18 is only conductive above a threshold potential applied at base 16. When the switch 12 is open (as shown) the potential applied to the base 16 of the transistor 18 is below the threshold and accordingly current cannot flow through the transistor and so LED 20 remains unilluminated. In this condition, the capacitor 24 will be charged. When the switch 12 is closed, a potential is applied from terminal 14 to the base 16 via resistor 26 that renders the transistor 18 conductive and so current passes through the LED, which emits light. At the same time, capacitor 24 is discharged.

Figure 1:
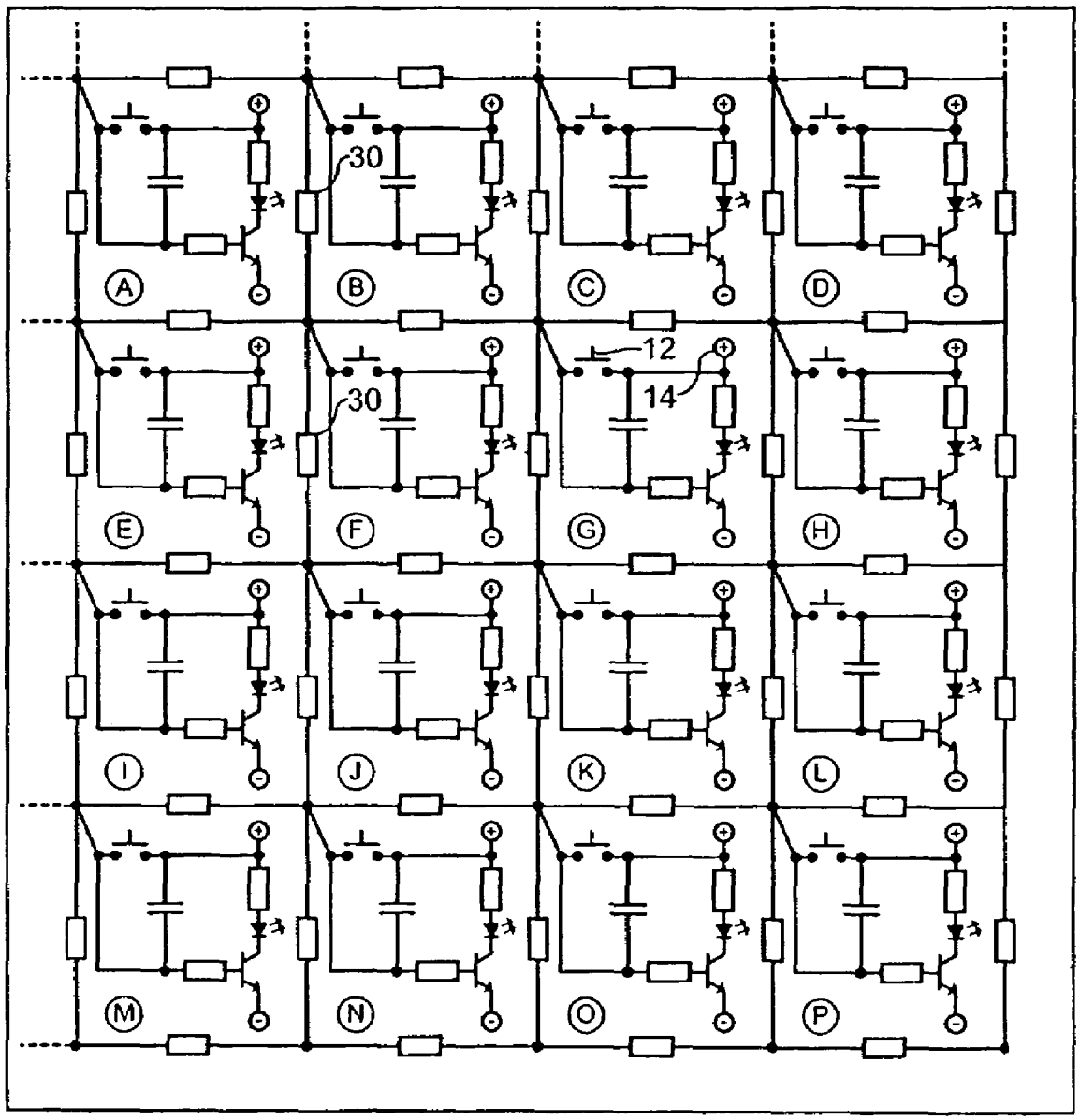
FIG. 1 shows an array of circuits forming an illuminating surface according to the present invention.

In addition to applying potential to the transistor 18 of its own circuit, G, the potential from terminal 14 is applied to the four adjacent circuits C, F, H and K (see FIG. 1) via switch 12 of circuit G and connections 32, lines 28 and resistors 30 (only circuit K is shown full in FIG. 2 and for that reason, the following description will make particular reference to circuit K but, as is clear from FIG. 1, the same will also apply to each adjacent circuit). The potential is applied via the connection 32 and the resistor 26 of each such adjacent circuit to the base terminal of the transistor 18 of that circuit. The potential applied to base 16 is sufficient to cause the transistor 18 to become conductive and hence for the LED of adjacent circuit K to emit light.

Because of the presence of resistors 30, the potential applied to base 16 of circuit K will be less than that applied to the base 16 of circuit G (assuming the switch 12 of circuit K remains open). In addition, it will take a greater amount of time for the base terminal 16 of circuit K to reach the threshold potential due to the need to partially discharge capacitor 24 of circuit K with the current supply from circuit G. Thus, LED 20 of circuit K starts emitting light slightly after the LED of circuit G.

If the switch 12 of circuit K were closed, then the potential at base 16 would be the same in circuit K as in circuit G. However, assuming that the switch 12 of circuit K is not closed, the lighting up of LED 20 of circuit K after LED 20 of circuit G gives the appearance of the illuminated area spreading over time. When the switch 12 of circuit G is opened, the potential applied at bases 16 of circuits G and K fall and, when they reach their threshold values, transistors 18 of the these two circuits cease to be conductive. Because the potential at base 16 of circuit K is lower than that of base G, transistor 18 of circuit K becomes non-conductive before that of circuit G (assuming the switch 12 of circuit K is never closed). This gives an impression that the illuminated area shrinks and fades from the edge inwards.

The potential at base 16 reduces as a result of the charging of the capacitor 24 and leakage of potential through other circuits in the network. The duration of the reduction in potential at base 16 to its threshold value will depend on the value of resistors 26 and 30 and the capacitance of the capacitor 24.

Referring now to FIG. 1, if the switch 12 of circuit G were closed, the potential from source 14 will be applied via a single resistor 30 to circuits C, F, H and K, thereby causing the LED of those circuits to emit light. The terminal 14 will be connected via two resistors 30 to circuits B, D, E, J, L and 0. Depending on the value of the resistors 30 and 26, that may be sufficient to cause the transistors 18 of those circuits to become conductive and so their LED's to emit light.

In a preferred embodiment, the values of the various components are as follows:

| | |
|---|---|
| resistor 22: | 330 ohms |
| resistor 26: | 4700 ohms |
| resistor 30: | 10 to 30 megaohms |
| capacitor 24: | 220 nF |
| threshold value of base 16: | 1.5 volts |

Figure 3:
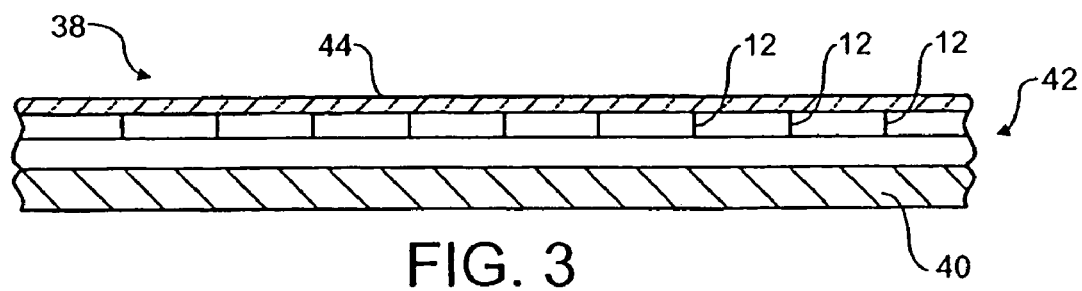
FIG. 3 is a schematic partial sectional view of a panel having a surface according to the present invention.

A partial sectional view of a panel having a surface according to the present invention is shown schematically in FIG. 3. The panel includes a rigid backing sheet 40 supporting the circuits 10 of FIGS. 1 and 2 shown schematically by the reference number 42 in FIG. 3. The switches 12 of the circuits of FIGS. 1 and 2 are also shown and they can be closed by the application of a light pressure to them. The top layer of the panel is formed by a flexible sheet 42 of transparent or translucent plastic 44. When a person treads on the panel, the top layer 44 depresses the switches immediately under the person's foot, thereby closing switches 12 and illuminating the LEDs of the associated circuits 10. After an interval, the area of panel 38 that is illuminated by LEDs spreads to adjacent circuits 10 in the manner described above. When the person's foot is lifted, the LED of each circuit will remain illuminated until the threshold voltage at the base terminal 16 of that circuit falls below the threshold value. This will happen for circuits 10 whose switch 12 are not closed before it occurs in the circuits whose switches 12 are closed, which will give the effect of the area of the panel illuminated shrinking over time. The area of the panel 38 that is illuminated by LEDs will correspond generally to the shape of the person's foot (or other object pressing against the sheet 44), although it will of course be larger because of the activation of the adjacent circuits, as described above. The resolution of the surface will depend on the number of LEDs per unit area, which will typically be 1,000 per square metre or above.

The circuit will generally be provided in the form of panels or tiles having connectors at their edges to connect to adjacent panels to form the lines 28 connecting the circuits 10 together across the whole extent of a surface that is larger than each individual panel or tile.

Figure 4:
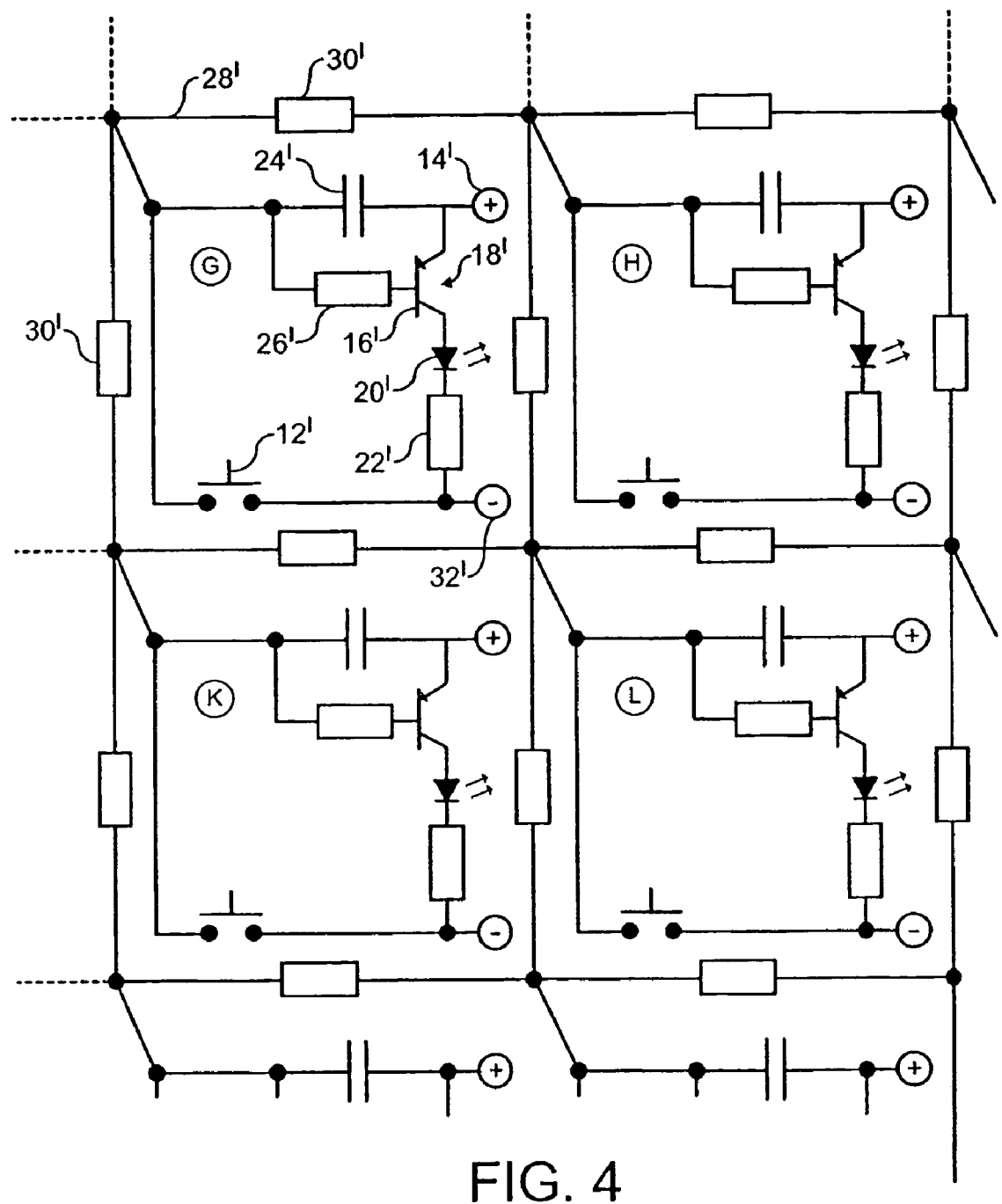
FIG. 4 shows a further array of circuits forming an illuminating surface according to the present invention.

The circuit of FIG. 4 is generally similar to that of FIGS. 1 and 2 and the same reference numerals will be used in FIG. 4 to refer to the same components that were described in connection with FIGS. 1 and 2 except that in FIG. 4 an apostrophe (') will be added after the reference numeral.

The main difference between the circuit of FIG. 4 and that of FIGS. 1 and 2 is that the transistor 18' is a PNP-type transistor instead of the NPN-type transistor 18 used in FIGS. 1 and 2.

The operation of the FIG. 4 circuit is the same as that of FIGS. 1 and 2 except as detailed below. Transistor 18' is only conductive above a threshold potential applied at base 16'. When the switch 12' is open (as shown) the potential applied to base 16' of transistor 18' is below the threshold and accordingly current cannot flow through the transistor and so LED 20' remains unilluminated.

When switch 12' is closed, a potential is applied from terminal 14' to the base via resistor 26' that renders the transistor 18' conductive and so current passes through the LED, which emits light. At the same time, capacitor 24' will be charged. As soon as switch 12' is opened capacitor 24' will slowly discharge, causing LED 20' to remain illuminated until capacitor 24' is discharged below the threshold potential of transistor 18'.

The potential at base 16' reduces as a result of the discharge of the capacitor 24'. The duration of the reduction in potential at base 16' to its threshold value will depend on the value of resistors 26' and 30' and the capacitance of capacitor 24'.

In the same way as described in connection with FIGS. 1 and 2, when the switch 12' of any circuit of FIG. 4 is closed, the neighbouring circuits will also be illuminated but this will take place after the illumination in the circuit where the switch is closed. Likewise, when the switch is opened, the illumination of the neighbouring circuits (whose switches are open all the time) will fade first.

The values of the components of the FIG. 4 circuit are the same as those given for the FIGS. 1 and 2 circuit.

The main advantage of the FIG. 4 circuit over that of FIGS. 1 and 2 lies in the fact that, when first powered up, the LED 20 of circuit of FIGS. 1 and 2 is illuminated until the capacitor 24 is charged up. On the other hand, when the circuit of FIG. 4 is first powered up, the LED 20' is not illuminated.

The invention claimed is:

1. An illuminating surface that, when connected to a power source, emits light in the presence of an object touching or in close proximity to the surface, which surface comprises:
   an array of sensors for detecting the presence of the object;
   an array of light sources, each sensor being associated with and proximal to at least one light source such that, when one of said sensors detects the presence of the object, its associated light source is illuminated; and
   a circuit for controlling the illumination of each light source such that it remains illuminated for a time after its associated sensor has ceased to detect the presence of the object;
   wherein each of the sensors is connected to multiple light sources, such that when a first sensor detects the presence of an object, the first sensor causes the at least one light source associated with the first sensor to be illuminated and also causes at least one adjacent second light source associated with a second different sensor to be illuminated even if the second sensor has not detected the presence of the object, thereby causing an area of the surface to emit light that corresponds to and is larger than the shape of the object, whereby illumination is visible to an observer even if the object blocks light sources associated with sensors activated by the object.

2. An illuminating surface as claimed in claim 1, which includes an array of circuits, each circuit comprising at least one sensor and at least one light source.

3. An illuminating surface as claimed in claim 2, wherein each circuit has its own power supply and is not under the control of a central processor for the surface.

4. An illuminating surface as claimed in claim 2 or claim 3, wherein adjacent circuits are connected in such a way that, when the sensor of one circuit detects the presence of the object touching or adjacent to the surface of the one circuit, at least one adjacent circuit causes its light source to be illuminated even if the sensor associated with said at least one adjacent circuit has not detected the presence of the object.

5. An illuminating surface as claimed in claim 4, wherein the light source of the said at least one adjacent circuit is illuminated after a delay following the illumination of the light source of the said detecting circuit, thereby giving the effect that the area of the surface that emits light in the presence of the object spreads.

6. An illuminating surface as claimed in claim 4, wherein the light source of the said at least one adjacent circuit ceases to be illuminated prior to the light source of the said detecting circuit, thereby giving the effect that the area of the surface that emits light shrinks when the object is no longer touching or adjacent to the surface.

7. An illuminating surface as claimed in claim 4, wherein each detecting circuit is energisable from a power source when its sensor detects the presence of an object touching or in close proximity to the surface, thereby illuminating the light source of that circuit.

8. An illuminating surface as claimed in claim 7, wherein current from the said detecting circuit leaks to at least one adjacent circuit, thereby energising the light source of the adjacent circuit.

9. An illuminating surface as claimed in claim 4, wherein each circuit comprises transistor having a base terminal, the arrangement is such that the light source is illuminated when the transistor is conductive and wherein, when the sensor detects the object, the potential at the base terminal is changed, thereby causing the transistor to become conductive.

10. An illuminating surface as claimed in claim 9, wherein each circuit is connected to the base of the transistor of the at least one adjacent circuit, whereby potential from a detecting circuit is applied to the transistor base terminal of the adjacent circuit, thereby changing the potential of the adjacent circuit transistor base terminal, allowing current to flow through the transistor of the adjacent circuit and causing the light source of the adjacent circuit to be illuminated.

11. An illuminating surface as claimed in claim 10, wherein the detecting circuit is connected to the base of the transistor of the at least one adjacent circuit via a resistor such that the potential applied to the base of the transistor of the at least one adjacent circuit is less than the potential applied to the base of the transistor of the detecting circuit.

12. An illuminating surface as claimed in claim 1, wherein the sensors are switches that are closed by the object touching the surface.

13. An illuminating surface as claimed in claim 1, in the form of a floor or wall tile.

14. An illuminating surface as claimed in claim 1, connected to a power source.

* * * * *